United States Patent [19]

Aron

[11] Patent Number: 4,922,700
[45] Date of Patent: May 8, 1990

[54] HAYMAKING MACHINE

[75] Inventor: Jerome Aron, Bouxwiller, France

[73] Assignee: Kuhn, s.a., Saverne, France

[21] Appl. No.: 357,278

[22] Filed: May 26, 1989

[30] Foreign Application Priority Data

Jun. 3, 1988 [FR] France .................. 88 07598

[51] Int. Cl.$^5$ ............................ A01D 78/10
[52] U.S. Cl. ........................ 56/370; 56/367
[58] Field of Search .............. 56/365, 367, 370, 372, 56/374, DIG. 10, DIG. 21

[56] References Cited

U.S. PATENT DOCUMENTS

| 3,735,573 | 5/1973 | Dziuba et al. | 56/370 |
| 4,345,422 | 8/1982 | Amstutz | 56/367 X |

FOREIGN PATENT DOCUMENTS

| 0259556 | 7/1987 | European Pat. Off. |  |
| 2059269 | 6/1971 | Fed. Rep. of Germany . |  |
| 2833814 | 2/1980 | Fed. Rep. of Germany . |  |
| 3628604 | 2/1988 | Fed. Rep. of Germany . |  |
| 1374202 | 11/1963 | France . |  |
| 1566084 | 5/1969 | France . |  |
| 2093488 | 1/1972 | France . |  |
| 2127029 | 10/1972 | France . |  |
| 2133976 | 12/1972 | France . |  |
| 2358820 | 7/1976 | France . |  |
| 2415955 | 8/1979 | France . |  |
| 459641 | 9/1968 | Switzerland | 56/370 |

Primary Examiner—Jerome W. Massie
Assistant Examiner—David J. Bagnell
Attorney, Agent, or Firm—Oblon, Spivak, McClelland, Maier & Neustadt

[57] ABSTRACT

A windrowing rotor 1 is driven in rotation and equipped with tools to windrow plants that are on the ground. A cover 26 is jointed on a beam 2 by a hinge pin 33 that is at least approximately horizontal and that is at least approximately perpendicular to the beam 2. A central support pin 7 is housed in a bore 25 in the cover 26 so as to be able to turn during work in relation to the hinge pin 33 together with a control cam 16, a frame 18, and small wheels 19, 20, and 21.

16 Claims, 3 Drawing Sheets

HAYMAKING MACHINE

FIELD OF THE INVENTION

This invention relates to a haymaking machine comprising a rotor driven in rotation and equipped with work tools to windrow plants that are on the ground. The rotor is connected to a beam or a similar support equipped with a three-point coupling device for hooking to a drive tractor, and it comprises a central support pin carrying a control cam for the work tools. The pin is connected to a frame with small support wheels which move over the ground in the work position and which are placed in such a way that their axes of rotation are located at least approximately in two vertical planes which are offset in relation to one another in the direction of movement. The connection between the rotor and the beam comprises a hinge pin that is at least approximately horizontal, that is at least approximately perpendicular to the beam, and that is located between the two vertical planes.

BACKGROUND OF THE INVENTION

On a machine of this type shown and described in patent application No. DE-A-28 33 814, the rotor is jointed in relation to the support beam through two joints provided above one another. One of the two joints comprises horizontal pivot pins which are connected to the rotor, while the other one of the two joints comprises a vertical pivot pin connected to the support beam. The two joints are intended to allow the rotor to follow the irregularities of the ground and to adapt to the curves of the path over which the machine is moved.

The ability of this machine to adapt to the curves of the path is, however, very limited. The rotor of the machine actually can be moved only by an angle of slight value around the vertical pivot pin if it is desired to provide it with a drive in correct rotation from the tractor. This machine is, therefore, not able to provide a good windrowing under all conditions.

OBJECT OF THE INVENTION

This invention has as its principal object a haymaking machine with a windrowing rotor that can follow the irregularities of the ground and that can adapt to relatively abrupt curves of the path followed.

SUMMARY OF THE INVENTION

For this purpose, an important characteristic of the invention is that the rotor comprises a cover which is jointed on the support beam by a hinge pin that is at least approximately horizontal and at least approximately perpendicular to the beam. The central support pin of the rotor is received in a bore of the cover. The central support pin and a control cam are able to turn during work in relation to the hinge pin together with a control cam and the frame with the small wheels. This arrangement makes it possible for the rotor to follow the irregularities of the ground well and always to keep the gathering zone of the work tools in the most forward portion of their path regardless of the direction of movement. In this case, the position of the drive elements of the rotor remains unchanged. The hay is thus correctly gathered and windrowed in at least substantially all the curves that the rotor of the machine must follow. In addition, the small wheels are constantly near the gathering zone to allow the tools to follow the irregularities of the ground well. This is also possible in curves and turns thanks to the possibility that the rotor has of pivoting around the hinge pin with the beam in any position.

Other characteristics and advantages of the invention will become apparent from the following description of a nonlimiting example of an embodiment of the invention.

DETAILED DESCRIPTION OF THE PRESENTLY PREFERRED EMBODIMENT

Figure 1:
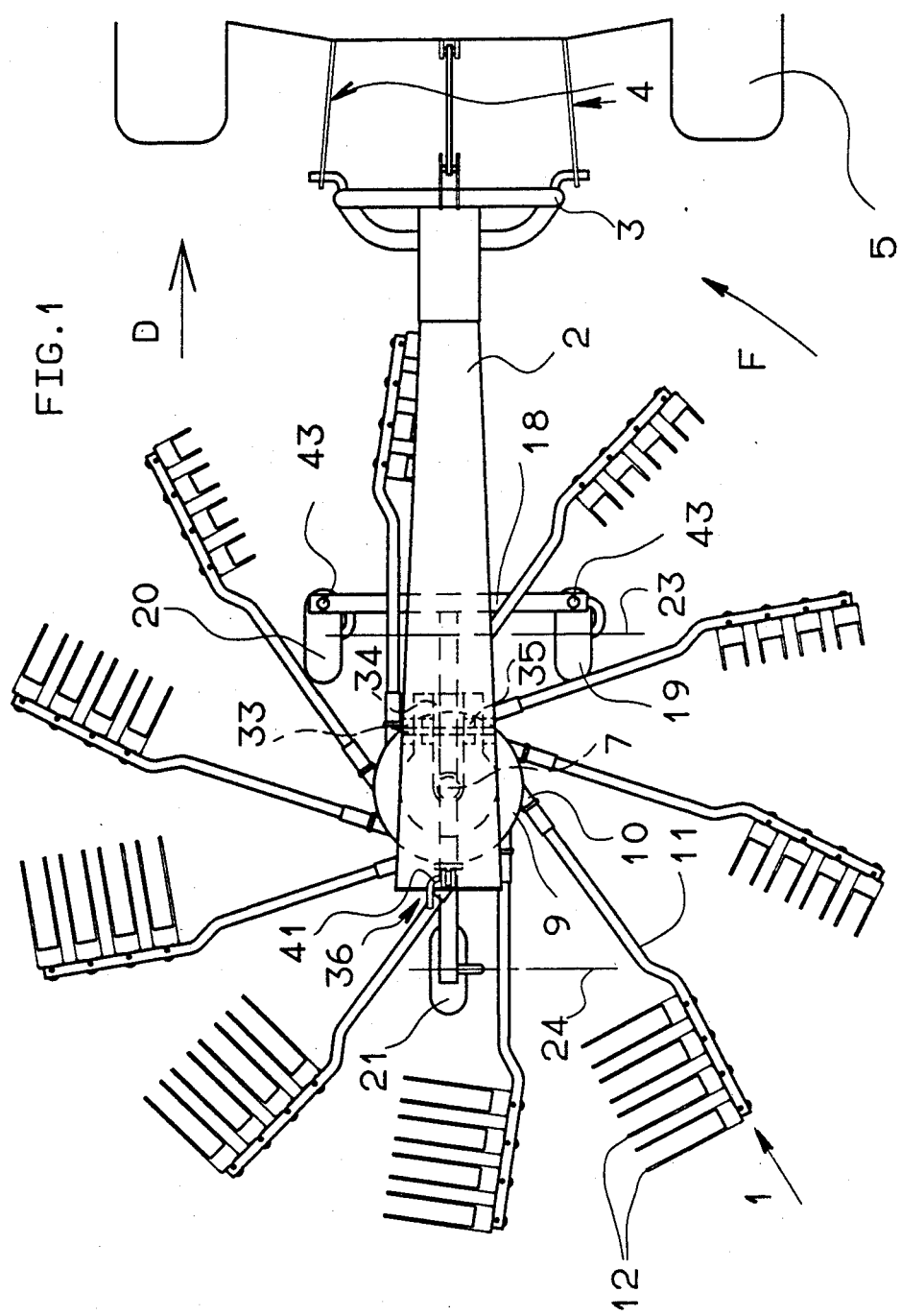
FIG. 1 is a top view of a machine according to the invention on a straight path.
Figure 2:
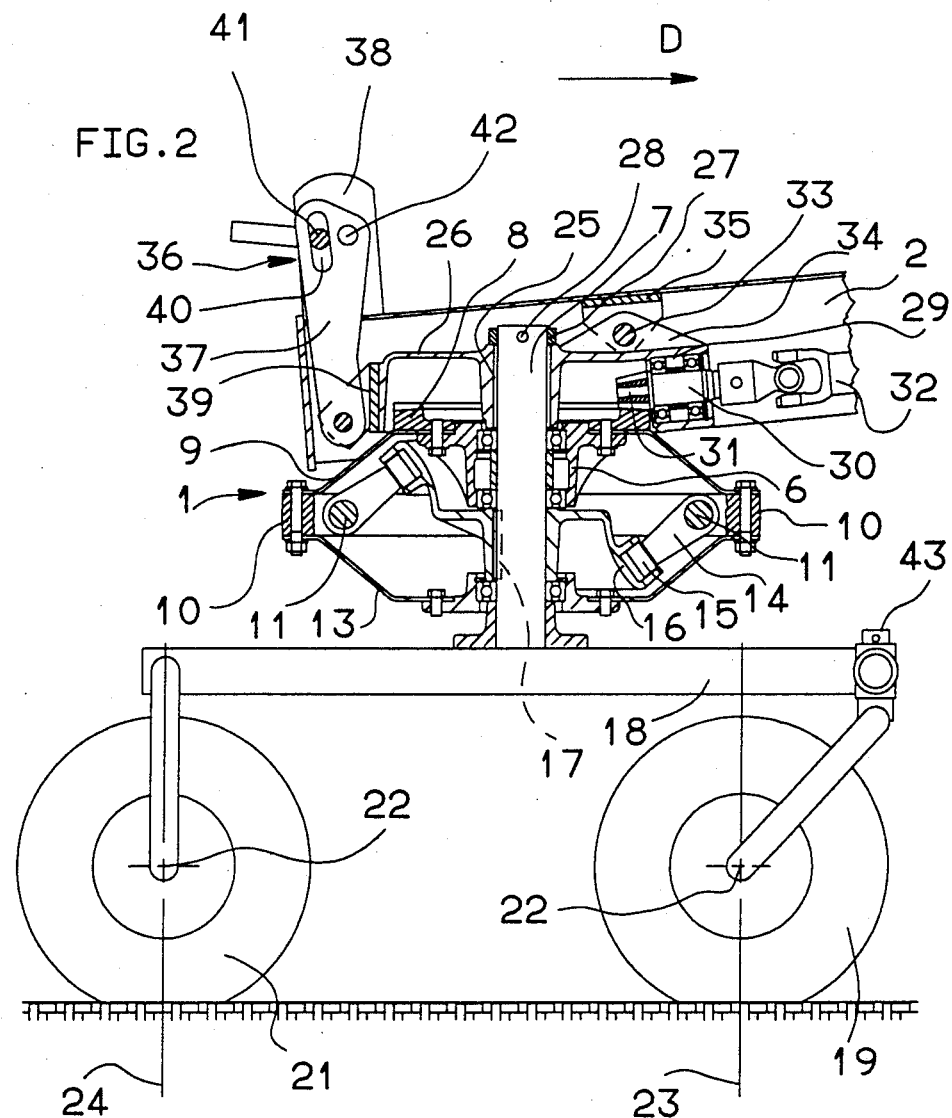
FIG. 2 is a section through the rotor of the machine on a larger scale.
Figure 3:
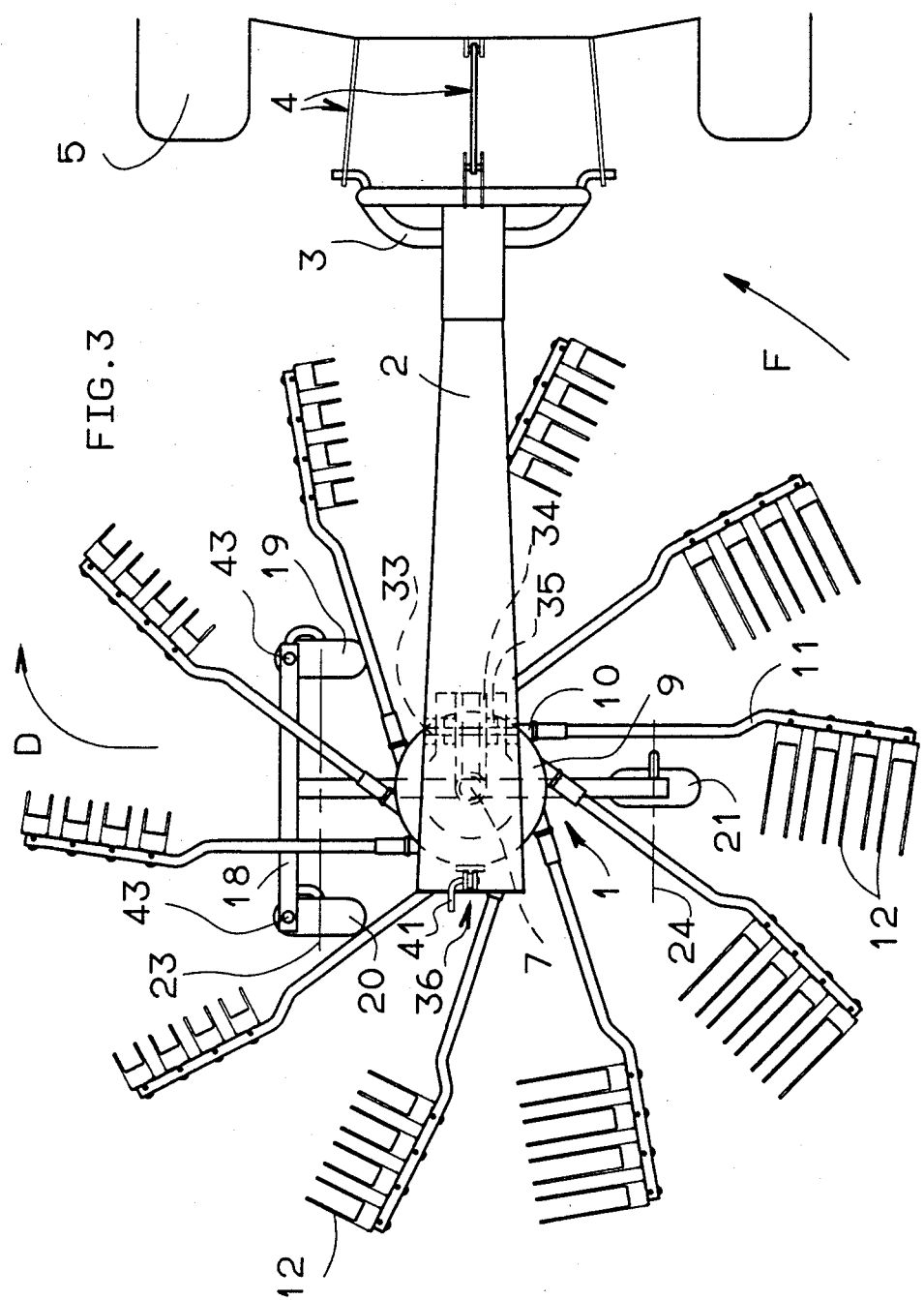
FIG. 3 is a view similar to FIG. 1 of a machine in a turn.

As shown in FIGS. 1-3, the presently preferred embodiment of the machine comprises a windrowing rotor 1. The windrowing rotor 1 is connected to a beam 2 or to a similar support which extends more or less horizontally. The beam 2 is equipped with a three-point coupling device 3 for hooking to lifting connecting rods 4 of a tractor 5.

As is best seen in FIG. 2, the windrowing rotor 1 is composed of a hub 6 mounted for free rotation on a support pin 7 that is at least approximately vertical. The hub 6 carries a ring gear 8 and a first support 9 on which bearings 10 are fastened. Arms 11 equipped with fork-shaped work tools 12 are journaled in the bearings 10. A second support 13 is provided on the side opposite the bearings 10 to improve their performance.

In the example shown in the drawings, the windrowing rotor 1 has ten arms 11. Inside the volume delimited by the two supports 9 and 13, each arm 11 has a lever 14 with a roller 15 which is located in a control cam 16. The control cam 16 is connected to the support pin 7 by a key 17. The support pin 7 is itself carried by a T-shaped frame 18 which is equipped with three small support wheels 19, 20, and 21 which move over the ground during work. Each of the small support wheels 19, 20, and 21 has an axis of rotation 22. The small support wheels 19, 20, and 21 are placed under the windrowing rotor 1 so that their axes of rotation 22 are located at least approximately in two vertical planes 23 and 24 which are offset in relation to one another in the direction of movement (indicated by arrow D). The two vertical planes 23 and 24 are at least approximately perpendicular to the direction of movement D and are located one in front and the other in back of the support pin 7. The three small support wheels 19, 20, and 21 are arranged in the shape of a triangle and are located in the vicinity of the path of the fork-shaped work tools 12.

The support pin 7 also passes through a first bore 25 of a cover 26 placed above the hub 6 and the ring gear 8. At the upper end of the support pin 7 is provided a stop ring 27 immobilized by means of a pin 28. The cover 26 also has a second bore 29 in which a drive shaft 30 is guided. The drive shaft 30 has a pinion 31 which meshes with the ring gear 8. The other end of the drive shaft 30 is connected to a transmission shaft 32 which, in a way known in the art, is connected to the power takeoff shaft of the tractor 5.

The link between the windrowing rotor 1 and the beam 2 is provided by an at least approximately horizontal hinge pin 33. The hinge pin 33 is preferably located between the two vertical planes 23 and 24 containing the axes of rotation 22 of the small support wheels 19, 20, and 21. For instance, the hinge pin 33 can be provided slightly in front of the support pin 7.

In view of this link, the cover 26 is provided with two lugs 34 each of which is provided with a passage hole for the hinge pin 33. The beam 2 comprises fastening lugs 35 with passage holes for the hinge pin 33. It is seen in FIG. 1 that the two lugs 34 are placed with a slight lateral play between the two fastening lugs 35. Thus, in a simple but precise manner the lateral positioning of the windrowing rotor 1 in relation to the beam 2 is obtained.

The beam 2 is at least partially open downwardly, and it covers the upper part of the windrowing rotor 1 and the hinge pin 33. It thus provides an effective protection of these parts. It is also seen in FIG. 1 that the hinge pin 33 is perpendicular to the beam 2 of the machine. The windrowing rotor 1 can thus pivot in relation to the beam 2 to follow the irregularities of the ground well.

The pivotings of the windrowing rotor 1 around the hinge pin 33 are limited with a device 36. The value of the pivoting angle between the two extreme positions of the windrowing rotor 1 can be on the order of 12°. This value is sufficient for the adaptation of the windrowing rotor 1 to the irregularities that it is likely to encounter on a normally maintained field. This value can, however, be increased or reduced depending on the case.

The device 36 is provided in back of the support pin 7. It is composed of a tongue 37 integral with the cover 26 of the windrowing rotor 1 and of two lugs 38 integral with the beam 2. The tongue 37 is located between the lugs 38 and is connected to the cover 26 of the windrowing rotor 1 by a yoke 39. It has a slot 40 which receives a pin 41 which also passes through circular holes in the two lugs 38. Thanks to the slot 40, the tongue 37 can move with the windrowing rotor 1 in relation to the lugs 38. The length of the slot 40 determines the pivoting angle of the windrowing rotor 1. The device 36 also makes it possible to lock the windrowing rotor 1 in relation to the beam 2. This locking is useful during transport to prevent rocking of the windrowing rotor 1 around the hinge pin 33 when the machine is carried by the tractor 5. For this purpose, the tongue 37 comprises a cylindrical hole 42 in which the pin 41 can be engaged after having aligned the cylindrical hole 42 with the circular holes provided in the lugs 38.

It is also seen in FIG. 2 that the support pin 7 passes, with a slight radial play, through the first bore 25 of the cover 26 of the windrowing rotor 1. The support pin 7, the control cam 16 (which is fastened to the support pin 7), and the T-shaped frame 18 form a unit free in rotation in relation to the hinge pin 33.

Furthermore, the two small support wheels 19 and 20 pivot in relation to the T-shaped frame 18 around pins 43 that are at least approximately vertical, while the small support wheel 21 is stationary in relation to the T-shaped frame 18. Because it is offset in relation to the support pin 7, the support wheel 21 moves continuously behind the support pin 7 regardless of the direction of movement of the machine. The small support wheel 21 thus assures the positioning of the unit consisting of the support pin 7, the control cam 16, and the T-shaped frame 18 as a function of the direction of movement.

During work, the machine is moved in the direction D, and the windrowing rotor 1 is driven in rotation from the tractor 5 in the direction of the arrow F. The rollers 15 of the arms 11 then move in the control cam 16. The race of the rollers 15 in the control cam 16 is such that, on the front portion of their path (seen in the direction of movement D), the fork-shaped work tools are directed downwardly and gather the plants lying on the ground and that, on the side portion of their path, the fork-shaped work tools 12 rise up and deposit the plants in the form of a windrow. The small support wheels 19, 20, and 21 follow the irregularities of the ground and guide the windrowing rotor 1. The windrowing rotor 1 then moves in relation to the beam 2 parallel to the direction of movement D around the hinge pin 33 so that the fork-shaped work tools 12 continually brush the surface of the ground.

In addition, the support pins 7, the control cam 16, and the small support wheels 19, 20, and 21 are automatically oriented so that the zone on which the fork-shaped work tools 12 gather the plants lying on the ground are located in the most forward portion of their path, even in curves and turns. As is shown in FIG. 3, the two small support wheels 19 and 20 always remain near the gathering zone. They cause the fork-shaped work tools 12 to follow the irregularities of the ground by causing the windrowing rotor 1 to pivot crosswise to the direction of movement D because the hinge pin 33 is then more or less directed in the direction D.

It is quite obvious that the invention is not limited to the embodiment as described above and represented in the accompanying drawings. Modifications remain possible, particularly from the viewpoint of the constitution of the various elements or by substitution of technical equivalents without thereby going outside the field of protection.

What is claimed as new and desired to be secured by Letters Patent of the United States is:

1. A haymaking machine comprising:
   (a) a rotor driven in rotation and equipped with tools to windrow plants that are on the ground, said rotor being connected to a beam or a similar support equipped with a three-point coupling device for hooking to a drive tractor;
   (b) a central support pin carrying a control cam for said tools, said central support pin being connected to a frame with small support wheels which move over the ground in the work position and which are placed in such a way that their axes of rotation are located at least approximately in two vertical planes which are offset in relation to one another in the direction of movement;
   (c) the connection between said rotor and said beam comprising a hinge pin that is at least approximately horizontal and approximately perpendicular to said beam, said hinge pin being located between said two vertical planes;
   (d) said rotor comprising a cover which is jointed on said beam by said hinge pin; and
   (e) said central support pin being housed in a bore in said cover so as to be able to turn during work in relation to said hinge pin together with said control cam, said frame, and said small support wheels.

2. A machine according to claim 1 wherein said cover is equipped with two lugs through which said hinge pin passes.

3. A machine according to claim 2 wherein said lugs are placed, with a slight lateral play, between two fastening lugs integral with said beam.

4. A machine according to claim 1 wherein said hinge pin is located inside said beam.

5. A machine according to claim 1 and further comprising means for limiting the pivotings of said rotor around said hinge pin.

6. A machine according to claim 5 wherein said means comprise a tongue mounted on said rotor and provided with a slot through which a pin passes, said pin being connected to lugs integral with said beam.

7. A machine according to claim 6 wherein said rotor can be locked in relation to said beam.

8. A machine according to claim 7 wherein said tongue has a cylindrical hole in which said pin can be introduced.

9. A machine according to claim 5 wherein said tongue has a cylindrical hole in which said pin can be introduced.

10. A machine according to claim 5 wherein the pivoting angle of said rotor around said hinge pin is about 12°.

11. A machine according to claim 1 wherein the axis of one of said small wheels is stationary in relation to said frame.

12. A haymaking machine comprising:
(a) a beam that, in use, is at least approximately horizontal and that extends in the direction of movement of said haymaking machine, said beam having a central vertical plane of symmetry that extends in the direction of movement of said haymaking machine;
(b) a three-point coupling device for hooking said beam to a drive tractor;
(c) a frame;
(d) a support pin mounted on said frame and extending therefrom in an at least approximately vertical direction;
(e) at least one front support wheel mounted on said frame in front of said support pin;
(f) at least one rear support wheel mounted on said frame behind said support pin;
(g) a control cam mounted on said support pin;
(h) a cover mounted on said support pin for pivotal movement about said support pin; and
(i) a hinge pin pivotally mounted on said cover so that, in use, it is at least approximately horizontal and is at least approximately perpendicular to said central vertical plane of symmetry of said beam, said hinge pin being located between said at least one front support wheel and said at least one rear support wheel and being operatively connected to said beam.

13. A haymaking machine as recited in claim 12 wherein said support pin is fixedly mounted on said frame.

14. A haymaking machine as recited in claim 12 wherein:
(a) two front support wheels are mounted on said frame in front of said support pin, one on each side of said central vertical plane of symmetry of said beam, and
(b) said two front support wheels are located at least approximately the same distance in front of said support pin.

15. A haymaking machine as recited in claim 12 wherein said at least one rear support wheel is located at least approximately on said vertical plane of symmetry of said beam.

16. A haymaking machine as recited in claim 12 wherein said control cam is fixedly mounted on said support pin.

* * * * *